United States Patent

Goujard et al.

[11] Patent Number: 5,965,266
[45] Date of Patent: Oct. 12, 1999

[54] COMPOSITE MATERIAL PROTECTED AGAINST OXIDATION BY A SELF-HEALING MATRIX, AND A METHOD OF MANUFACTURING IT

[75] Inventors: Stéphane Goujard, Merignac; Jean-Luc Charvet, St. Medard en Jalles; Jean-Luc Leluan, Bordeaux; Francois Abbe, Martignas; Ghislaine Lamazouade, Arsac, all of France

[73] Assignee: Societe Nationale D'Etude et de Construction de Moteurs D'Aviation, Paris, France

[21] Appl. No.: 08/930,402

[22] PCT Filed: Mar. 28, 1996

[86] PCT No.: PCT/FR96/00467

§ 371 Date: Sep. 26, 1997

§ 102(e) Date: Sep. 26, 1997

[87] PCT Pub. No.: WO96/30317

PCT Pub. Date: Oct. 3, 1996

[30] Foreign Application Priority Data

Mar. 28, 1995 [FR] France ................................. 95 03606

[51] Int. Cl.[6] ........................................................ B32B 7/00
[52] U.S. Cl. ........................... 428/408; 428/357; 428/366; 428/379; 428/446; 428/627; 428/698; 428/699; 428/704; 428/902; 427/228; 427/255.7; 427/419.7
[58] Field of Search ........................................... 428/246, 408, 428/698, 699, 704, 379, 357, 366, 627, 367, 446, 902; 427/228, 255.7, 419.7, 255.2, 452

[56] References Cited

U.S. PATENT DOCUMENTS

| 4,668,579 | 5/1987 | Strangman et al. ................. 428/367 |
| 4,894,286 | 1/1990 | Gray ..................................... 428/408 |
| 5,246,736 | 9/1993 | Goujard et al. ..................... 427/249 |
| 5,298,311 | 3/1994 | Bentson et al. ..................... 528/216 |
| 5,326,732 | 7/1994 | Ogawa ................................. 501/90 |
| 5,756,208 | 5/1998 | Hauy et al. .......................... 428/379 |
| 5,776,550 | 7/1998 | Di sam et al. ...................... 427/452 |

FOREIGN PATENT DOCUMENTS 0483009  4/1992  European Pat. Off. .

*Primary Examiner*—Deborah Jones
*Assistant Examiner*—Abraham Bahta
*Attorney, Agent, or Firm*—Weingarten, Schurgin. Gagnebin & Hayes LLP

[57] ABSTRACT

A composite material protected by oxidation at intermediate temperatures not exceeding 850° C. comprises fiber reinforcement densified by a matrix which includes at least one self-healing phase including a glass-precursor component such as $B_4C$ or an Si—B—C system, together with excess free carbon (C) at a mass percentage lying in the range 10% to 35%. The, or each, self-healing phase can be interposed between two ceramic matrix phases, e.g. of SiC. While the material is exposed to an oxidizing medium, oxidation of the free carbon promotes oxidation of the precursor and transformation thereof into a glass capable of plugging the cracks in the matrix by self-healing.

18 Claims, 3 Drawing Sheets

COMPOSITE MATERIAL PROTECTED AGAINST OXIDATION BY A SELF-HEALING MATRIX, AND A METHOD OF MANUFACTURING IT

FIELD OF INVENTION

The present invention relates to composite materials, and more specifically it relates to protecting said materials against oxidation.

BACKGROUND OF THE INVENTION

The field concerned by the invention is that of thermostructural composite materials, and more particularly ceramic matrix composite (CMC) materials. These materials are characterized by their mechanical properties which make them suitable for building structural elements, and by their ability to maintain these mechanical properties at high temperature. Thermostructural composite materials are used in particular for making parts that are subjected to high thermomechanical stresses in aviation or space applications, e.g. parts of engines or fairing elements, or in friction applications, e.g. disk brakes for land vehicles or for aircraft.

CMC type thermostructural composite materials are constituted by fiber reinforcement densified with a matrix, the reinforcing fibers being of a refractory material such as carbon or a ceramic, and the matrix being a ceramic. Densifying the fiber reinforcement consists in filling the accessible pores of the matrix. It is performed by chemical vapor infiltration or by impregnation using a liquid precursor for the matrix and then transforming the precursor, generally by heat treatment. An intermediate coating or "interphase", in particular of pyrolytic carbon can be deposited on the fibers to optimize bonding between the matrix and the fibers, e.g. as described in document EP-A-0 172 082.

It is necessary to protect thermostructural materials against oxidation, particularly when they contain carbon, even when carbon is present only in an interphase between ceramic fibers and a ceramic matrix. The thermomechanical stresses to which such materials are subjected in use inevitably give rise to the matrix cracking. The cracks then provide access for oxygen in the ambient medium all the way to the core of the material.

A well-known method of protecting composite materials against oxidation consists in forming a coating having self-healing properties, which coating may be external or internal, i.e. it may be a coating anchored in the residual accessible pores. The term "self-healing" is used herein to designate properties whereby the material at its operating temperature passes to a viscous state that is sufficiently fluid to fill cracking of the matrix and thus block access to ambient oxygen. The self-healing coatings used are typically glasses or vitreous compounds, or else precursors therefor, i.e. substances capable of forming a glass by oxidizing at the operating temperature of the composite material (in situ glass formation).

Proposals have also been made in document FR-A-2 688 477 to form at least one continuous phase at the surface of the matrix or within the matrix, which phase is constituted by a ternary Si—B—C system. The relative proportions of silicon, boron, and carbon are selected so as to make it possible, by oxidation, to form a glass having the required viscosity characteristics for healing cracks at the intended operating temperatures, which temperatures may be as much as 1700° C.

Undeniably, that protection technique considerably increases the lifetime of thermostructural materials in an oxidizing atmosphere. Nevertheless, it has been observed that protection is less effective at intermediate temperatures, i.e. about 450° C. to 850° C., than it is at higher temperatures.

SUMMARY OF THE INVENTION

An object of the present invention is therefore to further increase the effectiveness of anti-oxidation protection as provided by incorporating at least one self-healing phase in the matrix of a composite material, specifically in the intermediate temperature range.

This object is achieved by the fact that the phase having the self-healing property (hereinafter the self-healing phase) comprises, at least within the composite material as initially formed, a mixture including a glass precursor suitable for forming a glass by oxidation at a temperature not exceeding 850° C., together with free carbon, the mass percentage of free carbon in the mixture lying initially in the range 10% to 35%, and preferably being greater than 15%. It will be observed that the figures given throughout this text relating to the mass percentage of free carbon are relative to the composite material as prepared prior to any loss of free carbon by oxidation.

Surprisingly, it has been observed that the presence of excess free carbon in the self-healing phase provides a very great improvement in the effectiveness of protection against oxidation. This improvement is remarkable specifically at intermediate temperatures, i.e. while the free carbon is associated with a precursor suitable for forming a glass having self-healing properties in a temperature range beginning at around 450° C., which is a value that is unusually low for a refractory ceramic.

A possible explanation for this paradoxical result might be as follows.

When the composite material is used in an oxidizing medium with the matrix cracked to a greater or lesser extent, it is possible to distinguish two oxidation phenomena that can take place. The first is harmful: this is oxidation of the carbon contained in the fibers and/or the interphase of the composite material, which oxidation progressively destroys the mechanical potential of the material. The second is beneficial: this is oxidation of the glass precursor contained in the matrix, thereby causing cracks to be plugged by self-healing and greatly reducing the access of oxygen from the surrounding to the core of the material, thus increasing its lifetime.

These two phenomena are in competition. If oxidation of the glass precursor is established too slowly, then the mechanical potential of the material begins to be degraded. If the glass precursor oxidizes quick enough, then it dominates over the phenomenon of harmful oxidation. The presence of excess free carbon in the self-healing phase encourages oxidation of the precursor. When the material is exposed to an oxidizing medium, then free carbon is lost as soon as a temperature is reached at which the carbon begins to oxidize. This increases the specific surface area for oxidation of the precursor, thereby increasing conversion thereof into glass at any given temperature. Also, the oxidation of free carbon takes place by trapping a significant portion of the oxygen that would otherwise have reached and oxidized the fibers and/or the interphase, and by creating a partial pressure of CO or of $CO_2$ it can also have the effect of reducing the partial pressure of oxygen in the crack, thereby giving the self-healing glass time to form and perform its function.

The beneficial effect of the presence of excess free carbon is particularly remarkable when it is associated with a precursor suitable for producing a glass that is self-healing at intermediate temperatures, since conversion into glass takes place more slowly at lower temperatures. By way of example, such a precursor can be constituted by boron carbide $B_4C$. The mass percentage of the free carbon in the self-healing phase formed by $B_4C$ and free carbon is then preferably greater than 15%, or even greater than 20%.

The beneficial effect of the presence of excess free carbon also exists when it is associated with a precursor suitable for producing a self-healing glass at higher temperatures. By way of example, such a precursor is the ternary Si—B—C system for temperatures greater than about 650° C., as described in document FR-A-2 668 477 when the mass percentage of free carbon is around 20%, or for temperatures exceeding 850° C. when the mass percentage of free carbon is no more than 10%. Such a precursor can also be silicon carbide SiC for temperatures exceeding 1000° C. when the mass percentage of free carbon is about 20%. In one embodiment at least one phase having self-healing properties is formed in which the glass-precursor component is suitable for oxidizing to form a glass having self-healing properties starting at approximately 450° C.

In general, for a given self-healing phase, the mass percentage of free carbon must decrease with increasing desire to achieve maximum effectiveness at high temperature. Firstly the conversion of the precursor into glass takes place more quickly at high temperatures, and secondly too much free carbon could give rise to the formation of a large quantity of glass resulting in excessive consumption of the matrix.

The effectiveness of the protection against oxidation can be optimized over a broad range of temperatures by forming within the matrix at least one first self-healing phase that is effective at intermediate temperatures, e.g. based on $B_4C$, and at least one second self-healing phase that is effective at high temperatures, e.g. based on Si—B—C, at least the first of these self-healing phases containing a sufficient quantity of free carbon. To ensure protection for carbon interphase and/or fibers in the composite material, these phases are formed in the order in which they are mentioned by interposing ceramic matrix phases that withstand oxidation better than the self-healing phases, so as to maintain reinforcement secured to the matrix and so as to limit crack propagation. When a plurality of self-healing phases containing free carbon are formed, the mass percentage of free carbon in the self-healing phases decreases starting from the phase closest to the fibers.

BRIEF DESCRIPTION OF THE DRAWING

In the description below, reference is made to the accompanying drawings, in which.

DETAILED DESCRIPTION OF THE EMBODIMENTS

Figure 1:
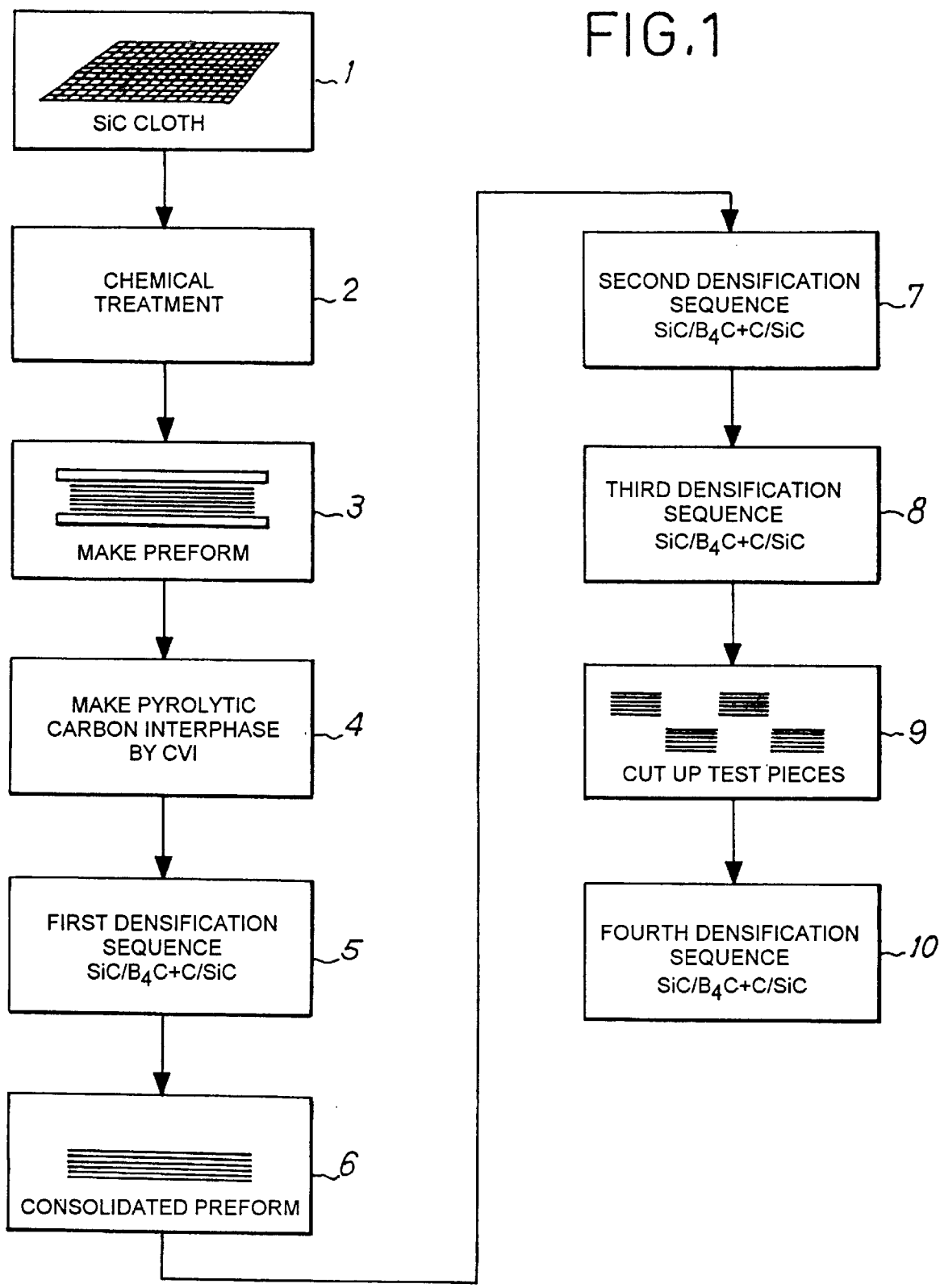
FIG. 1 shows the operations implemented successively when making parts out of CMC type composite material.
Figure 2:
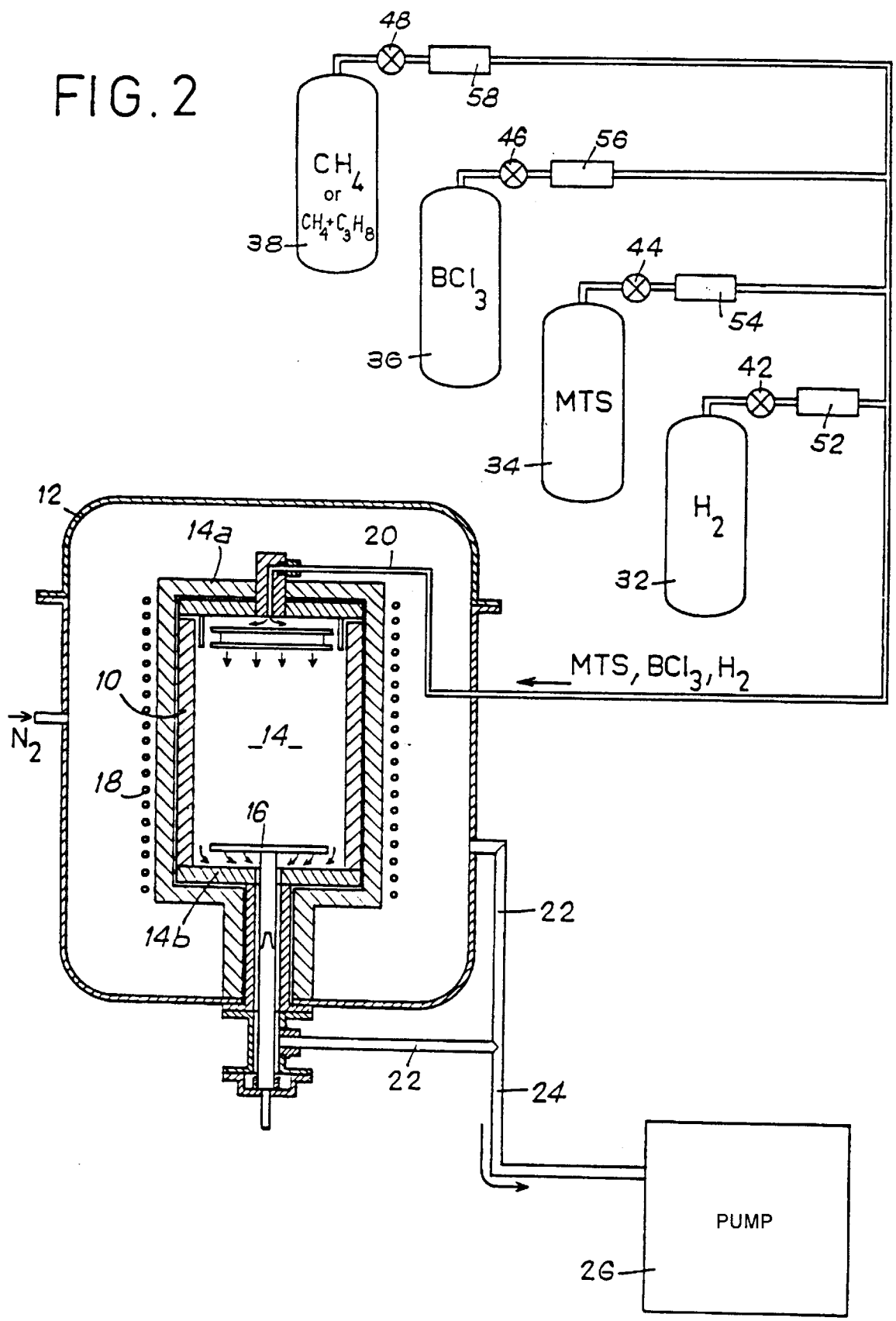
FIG. 2 is a highly diagrammatic view of an installation enabling parts to be made of composite material that is protected against oxidation in accordance with the invention.

With reference to FIGS. 1 and 2, there follows a description of a method of making CMC type thermostructural composite material parts having SiC fiber reinforcement together with an SiC matrix (SiC/SiC material), with self-healing phases constituted by boron carbide ($B_4C$) and excess free carbon incorporated in the matrix.

A two-dimensional fabric in the form of a plain weave cloth is made from fibers essentially constituted of silicon carbide (SiC fibers) sold by the Japanese company Nippon Carbon under the name "Nicalon NLM 202" (step 1).

The cloth is treated chemically, e.g. as described in document FR-A-2 640 258 (step 2).

Rectangular plies are cut from the cloth, are stacked on one another, and are pressed together in tooling (a "shaper") made of graphite to obtain a preform in the form of a rectangular parallelepiped having a thickness of 3 mm and in which the volume fraction occupied by the fibers, i.e. the percentage by volume of the preform that is indeed occupied by fibers, is 40% (step 3).

The preform held in this way in the tooling is placed in a chemical vapor infiltration oven to form an interphase coating of pyrolytic carbon on the fibers of the preform. By way of example, reference may be made to document EP-0 172 082 (step 4).

The preform provided in this way with its interphase coating and still held in the tooling within the infiltration oven is then subjected to a first densification sequence comprising, in succession, forming a silicon carbide (SiC) matrix phase, forming a self-healing phase constituted by boron carbide ($B_4C$) and by excess free carbon (C), and forming an SiC matrix phase that does not contain free carbon (step 5).

The first densification sequence confers sufficient consolidation to the preform to enable it to be removed from the tooling outside the infiltration oven (step 6), i.e. this sequence establishes adequate bonding between the fibers.

The consolidated preform is strong enough to be capable of being handled while retaining its shape. It is put back into the infiltration oven to be subjected to a second densification sequence similar to the first, i.e.: $SiC/B_4C+C/SiC$ (step 7), and then to a third similar sequence $SiC/B_4C+C/SiC$ (step 8).

The densified preform is then removed from the oven and cut up into a plurality of parts in the form of rectangular parallelepipeds having dimensions of 20 mm×10 mm×3 mm for making mechanical test pieces (step 9).

The cut-apart pieces are put back into the infiltration oven to be subjected to a fourth and last densification sequence of $SiC/B_4C+C/SiC$ similar to the preceding sequences (step 10).

This provides composite material parts in which the matrix comprises alternating phases of SiC and of $B_4C+C$. The SiC phases are of a thickness that can increase with increasing distance from the fibers, e.g. lying in the range 0.5 $\mu$m close to the fibers and several tens of $\mu$m (e.g. 20 $\mu$m to 50 $\mu$m) at the surface of the material. The thickness of the $B_4C+C$ phases may also increase with increasing distance from the fibers, e.g. in the range 0.5 $\mu$m close to the fibers and several tens of $\mu$m at the surface of the material (e.g. 20 $\mu$m to 50 $\mu$m).

A chemical vapor infiltration installation can be used for implementing the above-described densification sequences, as shown diagrammatically in FIG. 2.

This installation comprises a graphite susceptor 10 situated inside an enclosure 12 and defining a reaction chamber 14 in which composite material parts to be treated are placed on a turntable 16. The susceptor is heated by an inductor 18 disposed around it.

The reaction chamber 14 is fed with gas for generating the desired deposit by means of a pipe 20 that passes through the wall of the enclosure 12 and that terminates inside the chamber 14 via a cover 14a that closes the top end thereof.

Residual gases are extracted from the reaction chamber by means of one or more pipes 22 that open out into the bottom 14b of the chamber and that are connected outside the enclosure to a pipe 24 connected to a pump 26.

The volume situated around the susceptor 10 inside the enclosure 12 is swept by an inert gas, such as nitrogen $N_2$ that forms a buffer around the reaction chamber.

Gas sources 32, 35, 36, and 38 deliver the components of the gas that is injected into the reaction chamber. Each source is connected to the pipe via a duct that includes a respective automatically controlled stop valve 42, 44, 46, and 48 together with a respective mass flow meter 52, 54, 56, and 58, the flow meters enabling the relative proportions of the components of the gas to be controlled.

To deposit SiC, the gas is made up of methyltricholorosilane (MTS) having a reducing element such as hydrogen $H_2$ added thereto.

For depositing $B_4C+C$, the element B is taken from a borane or a halide, such as boron trichloride ($BCl_3$), while the element C comes from a hydrocarbon such as methane ($CH_4$) or from a mixture of hydrocarbons, such as methane and propane, for example.

Consequently, the gas sources 32, 34, 36, and 38 are respectively sources of $H_2$, MTS, $BCl_3$, and $CH_4$ (or a mixture of $CH_4+C_3H_8$).

The source 38 is also used for forming the pyrocarbon interphase on the SiC fibers.

The composition of the $B_4C+C$ mixture, i.e. the percentage of excess free carbon, is controlled by selecting the proportions of the $BCl_3$, $CH_4$ (or mixture of $CH_4+C_3H_8$), and $H_2$ precursors in the gas.

Chemical vapor infiltration of the SiC ceramic phases of the matrix takes place at a temperature lying in the range about 800° C. to about 1150° C., under a pressure lying in the range about $0.1\times10^3$ $N/m^2$ to $50\times10^3$ $N/m^2$, while chemical vapor infiltration of the $B_4C+C$ self-healing phases is implemented at a temperature lying in the range about 800° C. to about 1150° C. and at a pressure lying in the range about $0.1\times10^3$ $N/m^3$ to $50\times10^3$ $N/m^2$.

Various test pieces A to D of composite material have been made in the manner described above using the following respective mass percentages of free carbon in the various self-healing phases: 0%, 8%, 12%, 18% and 26% (the percentage being the same for all of the self-healing phases in a given material).

Figure 3:
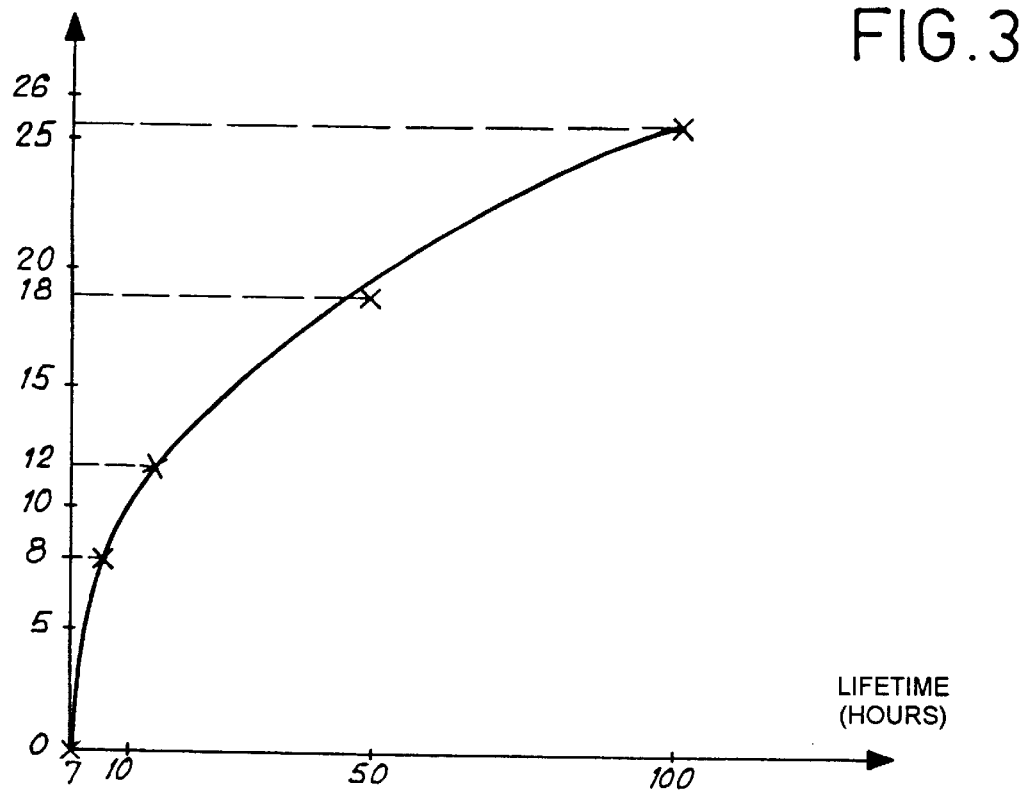
FIG. 3 is a graph in which the curve shows the relationship between lifetime as measured during fatigue testing on a CMC type composite material part with a matrix containing phases that are self-healing at intermediate temperatures and the mass percentage of free carbon present in the self-healing phases in association with boron carbide.

The test pieces were subjected to traction fatigue tests at 600° C. in air with the traction stress exerted being caused to vary from 0 to 120 MPa at a frequency of 2 Hz. The lifetime was measured as the time that elapsed between the beginning of the test and the test piece breaking. FIG. 3 shows the relationship between the mass percentage of free carbon and lifetime. Lifetime increases with increasing mass percentage of free carbon, in the range examined. When the mass percentage of free carbon is 26%, the test was stopped after 100 hours have elapsed, test piece D still being unbroken. Naturally the mass percentage of excess carbon cannot exceed a limit which is about 35%, beyond which the disappearance of carbon cannot be compensated sufficiently by the increase in volume that results from oxidation of the precursor, which could lead to defective plugging.

FIG. 3 shows the remarkable effectiveness of adding excess free carbon in the self-healing phase for an intermediate temperature (600° C.). For the material in which the self-healing phase was constituted by boron carbide containing 26% by mass of free carbon, the lifetime under the same test conditions was likewise greater than 100 hours at 500° C., whereas it was only about 50 hours for a material in which the self-healing phase was constituted by boron carbide without excess free carbon.

In order to test the effectiveness of adding excess free carbon in a higher temperature self-healing phase, test pieces were made using the same method as that described with reference to FIG. 1, but in which the $B_4C+C$ self-healing phases were replaced by self-healing phases made up of a ternary Si—C—B system with a free carbon mass percentage equal to 8% and a B/Si ratio of about 6.5.

As described in above-mentioned document FR-A-2 668 477, the ternary Si—B—C system is obtained by chemical vapor infiltration using a gas that comprises a mixture of MTS, $BCl_3$, and $H_2$ precursors. The excess free carbon is obtained by selecting the relative proportions of MTS, $BCl_3$, and $H_2$, and optionally while adding the $CH_4$ (or $CH_4+C_3H_8$) precursor. The relative proportions of Si, B, and C in the ternary system Si—B—C determine the temperature at which the borosilicate glass formed by oxidation possess the required self-healing properties. For the above-envisaged materials of the SiC—SiC type, appropriately selecting these proportions makes it possible to cover a broad range of high temperatures starting at about 650° C. and extending to about 1200° C., at which temperature the "Nicalon NLM 202" fiber becomes unstable. A test piece E obtained in this way was subjected to fatigue testing under the conditions described above for test pieces A to D, with the exception that the temperature was raised to 1200° C. After 50 hours of testing, test piece E still had not broken.

By way of comparison, a test piece identical to test piece D which had the highest performance at intermediate temperatures, was subjected to fatigue testing at 1200° C., and it broke after 8 hours, while a test piece identical to test piece E was subject to fatigue testing at 600° C., and it broke after 7 hours.

Thus, in order to provide effective protection against oxidation over a wide range of temperatures, it is advantageous to combine the performance provided by a self-healing phase that is effective at intermediate temperature with the performance provided by a self-healing phase that is effective at high temperature.

Figure 4:
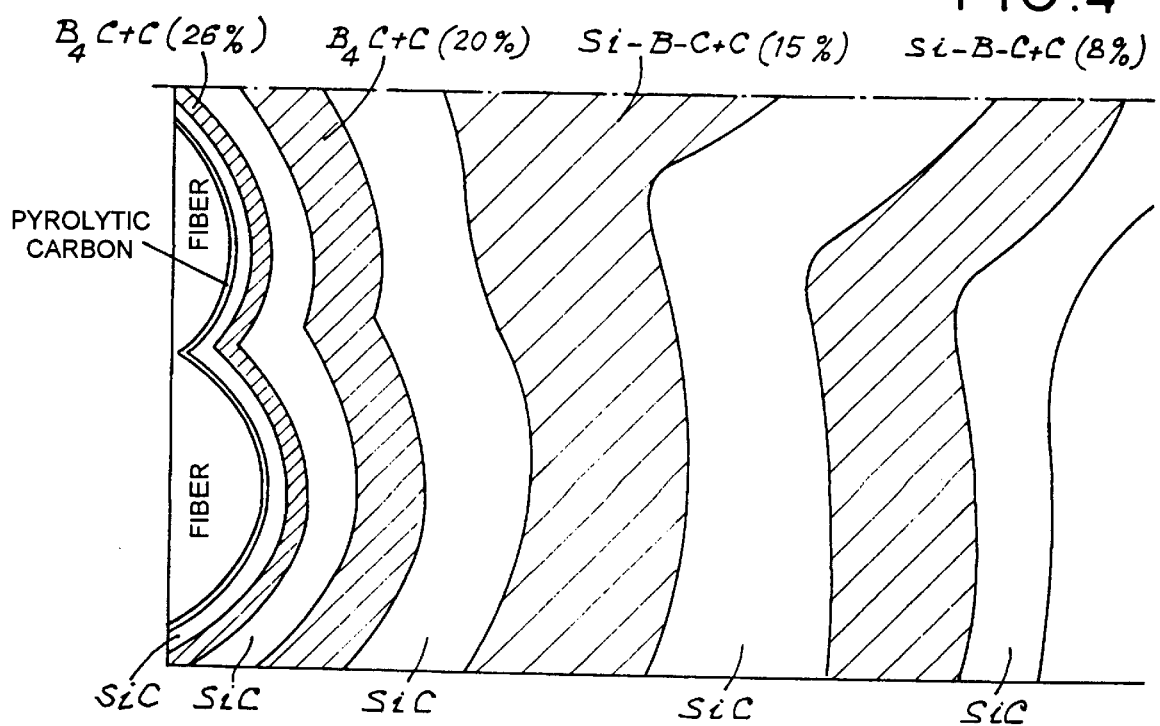
FIG. 4 is highly diagrammatic and shows the various phases constituting the matrix of a composite material protected against oxidation in accordance with the invention.

To this end, test pieces F were made using the method described with reference to FIG. 1, with the exception that in the last two densification sequences, the $B_4C+C$ self-healing phase was replaced by an Si—B—C self-healing phase, thus giving a sequenced matrix as shown in FIG. 4. In addition, the mass percentage of free carbon in the self-healing phases decreased from a value of 26% in the first-formed phase (the phase closest to the fibers) to a value of 8% in the last-formed phase, passing through values of 20% and 15% (B/Si equal to about 4.6) in the second and third phases, as shown in FIG. 4.

Test pieces F were subjected to fatigue testing as described above, respectively at 600° C. and at 1200° C. No breakage was observed after 100 hours at 600° C., or after 50 hours at 1200° C.

Finally, test pieces G having an SiC+B$_4$C matrix without any excess free carbon were likewise subjected to fatigue testing at 600° C. and at 1200° C. and 85 hours. Breakage was observed after 7 hours at 600° C. and after 35 hours at 1200° C.

The results of tests performed on test pieces D, E, F, and G are summarized in the following table.

| Material | % free C in self-healing phases | Fatigue testing at 600° C. | Fatigue testing at 1200° C. |
|---|---|---|---|
| D SiC/B$_4$C + C matrix | 26% | 100 h, no break | break at 8 h |
| E SiC/Si – B – C + C matrix | 8% | break at 7 h | 50 h, no break |
| F SiC/B$_4$ + C/ Si – B – C + C matrix | 26% to 8% starting from the fibers | 100 h, no break | 50 h, no break |
| SiC/B$_4$C matrix | 0% | break at 7 h | break at 35 h |

Naturally, the invention can be implemented with glass precursors other than those mentioned in the above implementations, and using a ceramic other than SiC for completing the matrix. Examples of glass precursors and of ceramic matrix precursors for CMC composite materials that are protected against oxidation are abundant in the state of the art.

In addition, the number of self-healing phases interposed in the matrix together with ceramic phases may be other than four. This number must be at least 1 when only one type of self-healing phase is provided, and it must be not less than the number of different types of self-healing phase that are provided. In this respect, more precise coverage of a very wide range of temperatures can be sought by forming successive self-healing phases of different compositions, beginning by those that are most effective at low temperatures and terminating by those that are most effective at high temperatures.

Finally, it will be observed that when a plurality of self-healing phases that are effective at different temperatures are formed with precursors for glasses of different compositions, there is no need for all of them to include excess free carbon. Thus, for example, in a material having one or more self-healing phases that are effective at intermediate temperatures and comprising boron carbide and excess free carbon, it is possible to incorporate one or more self-healing phases that are effective at higher temperatures comprising an Si—B—C system but without any excess free carbon.

We claim:

1. A composite material protected against oxidation, the material comprising fiber reinforcement densified by a matrix which includes at least one self-healing phase, comprising a component that is a precursor for a glass and that is suitable for forming a glass by oxidation at a temperature that does not exceed 850° C., said glass precursor component including carbon and at least one member of the group consisting of boron and silicon, the material being characterized in that said self-healing phase comprises, at least within the material as formed initially, a mixture of said glass precursor component and of excess free carbon, in which the mass percentage of the free carbon lies in the range of at least 15% to 35% of the mixture.

2. A composite material according to claim 1, characterized in that in said self-healing phase, the glass-precursor component is suitable for oxidizing to form a glass having self-healing properties starting at approximately 450° C.

3. A composite material according to claim 2, characterized in that the glass-precursor component is boron carbide.

4. A composite material according to claim 1, characterized in that said material comprises at least one phase having self-healing properties in which the glass-precursor component is suitable for forming a glass having self-healing properties starting at approximately 650° C.

5. A composite material according to claim 4, characterized in that the glass-precursor component is a ternary Si—B—C system.

6. A material according to claim 1, characterized in that said material includes a plurality of self-healing phases interposed with ceramic matrix phases that are better at withstanding oxidation than are the self-healing phases, at least one of the self-healing phases comprising, at least within the material as formed initially, a mixture of said glass precursor component and of excess free carbon.

7. A material according to claim 6, characterized in that the phases having self-healing properties are of different compositions.

8. A material according to claim 6, characterized in that the ceramic matrix phases that withstand oxidation best are of silicon carbide.

9. A material according to any one of claim 1, characterized in that it comprises at least one first phase having self-healing properties in which the glass-precursor component is suitable, on oxidation, for forming a glass having self-healing properties from about 450° C., and at least one second phase having self-healing properties in which the glass-precursor component is suitable for forming a glass having self-healing properties from about 650° C., the first phase having self-healing properties being closer to the reinforcing fibers than the second.

10. A composite material according to claim 3, characterized in that said material includes a plurality of self-healing phases, each phase comprising a mixture of a glass precursor component and excess free carbon, in which the mass percentage of excess free carbon in each phase decreases going away from the phase closest to the fibers.

11. A method of manufacturing a composite material including protection against oxidation, the method comprising making fiber reinforcement and densifying the reinforcement by means of a matrix comprising at least one self-healing phase including a glass-precursor component suitable for forming a glass by oxidation at a temperature not exceeding 850° C., the method being characterized in that said self-healing phase is made by forming a mixture of said glass-precursor component and of excess free carbon, in which the mass percentage of excess free carbon in the mixture lies in the range of at least 15% to 35%.

12. A method according to claim 11 characterized in that said self-healing phase is made by chemical vapor infiltration starting from a gas containing gaseous precursors for the glass-precursor component and for said excess free carbon, the gases being in proportions such that the mass percentage of excess free carbon in the self-healing phase lies in the range of at least 15% to 35%.

13. A method according to 11, characterized in that densification of the reinforcement comprises forming a plurality of phases having self-healing properties interposed between matrix phases that are better at withstanding oxidation, at least one of the phases having self-healing properties being made by forming a mixture of glass-precursor and of free carbon.

14. A method according to claim 13, characterized in that the phases having self-healing properties are formed by using different glass-precursors that oxidize to give glasses having self-healing properties in different temperature ranges.

15. A method according to claim 11, characterized in that at least one phase having self-healing properties is formed in which the glass-precursor component is suitable for oxidizing to form a glass having self-healing properties starting at approximately 450° C.

16. A method according to claim 11, characterized in that at least one self-healing phase is formed in which the glass-precursor component is suitable for forming a glass having self-healing properties starting at approximately 650° C.

17. A composite material according to claim 3, characterized in that:

said self-healing phase includes excess free carbon at a mass percentage that is initially not less than 15% of the mixture;

said material comprises at least one self-healing phase in which the glass-precursor component is suitable for forming a self-healing glass starting at approximately 650° C., the glass-precursor component being a ternary Si—B—C system;

the material includes a plurality of self-healing phases interposed with ceramic matrix phases that are better at withstanding oxidation than are the self-healing phases, at least one of the self-healing phases comprising, at least within the material as formed initially, a mixture of said glass precursor component and of excess free carbon, the self-healing phases having different compositions;

the ceramic matrix phases that withstand oxidation are of silicon carbide; and the material comprises at least one first self-healing phase in which the glass-precursor component is suitable, on oxidation, for forming a glass having self-healing properties starting at approximately 450° C., and at least one second self-healing phase in which the glass-precursor component is suitable for forming a glass having self-healing properties from about 650° C., the first self-healing phase being closer to the reinforcing fibers than the second self-healing phase, the material further including a plurality of self-healing phases, each phase comprising a mixture of a glass-precursor component and excess free carbon, in which the mass percentage of excess free carbon in each phase decreases going away from the phase closest to the fibers.

18. A method according to claim 12, characterized in that:

densification of the reinforcement comprises forming a plurality of self-healing phases interposed between matrix phases that are better at withstanding oxidation, at least one of the self-healing phases being made by forming a mixture of a glass-precursor component and of excess free carbon, the self-healing phases being formed by using different glass-precursors that oxidize to give glasses having self-healing properties in different temperature ranges;

at least one self-healing phase is formed in which the glass-precursor component is suitable for oxidizing to form a glass having self-healing properties starting at approximately 450° C.; and at least one self-healing phase is formed in which the glass-precursor component is suitable for forming a glass having self-healing properties starting at approximately 650° C.

* * * * *

UNITED STATES PATENT AND TRADEMARK OFFICE
CERTIFICATE OF CORRECTION

PATENT NO.    : 5,965,266
DATED         : October 12, 1999
INVENTOR(S)   : Stéphane Goujard, et al.

It is certified that error appears in the above-identified patent and that said Letters Patent is hereby corrected as shown below:

Column 8,
Line 27, delete "any one of";
Line 28, delete "it", and insert -- said material --.

Signed and Sealed this

Eighteenth Day of September, 2001

*Attest:*

*Attesting Officer*

NICHOLAS P. GODICI
*Acting Director of the United States Patent and Trademark Office*